United States Patent [19]

Suzuki

[11] Patent Number: 4,651,583

[45] Date of Patent: Mar. 24, 1987

[54] LOCKING MECHANISM

[75] Inventor: Kazuhiro Suzuki, Nishinomiya, Japan

[73] Assignee: Nippon Cable System, Inc., Hyogo, Japan

[21] Appl. No.: 758,241

[22] Filed: Jul. 24, 1985

[30] Foreign Application Priority Data

Apr. 16, 1985 [JP] Japan .................................. 60-80797
May 10, 1985 [JP] Japan .................................. 60-100064

[51] Int. Cl.$^4$ .......................... F16H 21/44; G05G 5/06
[52] U.S. Cl. .......................................... 74/96; 74/526; 74/527
[58] Field of Search ................... 74/96, 471 XY, 526, 74/527, 532, 565

[56] References Cited

U.S. PATENT DOCUMENTS

| | | | |
|---|---|---|---|
| 454,983 | 6/1891 | Mills | 74/96 |
| 1,392,316 | 10/1921 | Finch et al. | 74/532 |
| 2,607,867 | 8/1952 | Platz | 74/96 |
| 2,644,385 | 7/1953 | Brown | 74/96 |
| 2,891,816 | 6/1959 | Meats | 74/96 |
| 3,367,603 | 2/1968 | Feyerherd | 74/96 |
| 4,103,559 | 8/1978 | Kohler | 74/532 |

FOREIGN PATENT DOCUMENTS

| | | | |
|---|---|---|---|
| 1023268 | 1/1958 | Fed. Rep. of Germany | 74/96 |
| 1554082 | 3/1970 | Fed. Rep. of Germany | 74/527 |
| 502189 | 3/1939 | United Kingdom | 74/532 |

Primary Examiner—Lawrence Staab
Attorney, Agent, or Firm—Armstrong, Nikaido, Marmelstein & Kubovcik

[57] ABSTRACT

A locking mechanism comprising: a frame; a first rotational member being supported on the frame so as to rotate around a first axis and having a guiding portion having a component extending in the radial direction with respect to the first axis; a second rotational member being supported on the frame so as to rotate around a second axis parallel to the first axis and having an engaging portion to be slidably guided along the guiding portion at the position apart in the radial direction with respect to the second axis, wherein the guiding portion has a stopper capable of being in contact with the engaging portion at the position most apart from the first axis, and when the engaging portion is in contact with the stopper, an angle which a straight line tangential to the guide way of the guiding portion forms with a straight line connecting the engaging portion with the second axis is substantially 90°. The locking mechanism can be applied to various device having a member to be locked such as an operating lever, so that the member can be easily locked at a predetermined position.

7 Claims, 13 Drawing Figures

LOCKING MECHANISM

BACKGROUND OF THE INVENTION

The present invention relates to a locking mechanism and more particularly, to a locking mechanism which can be applied to various devices having a member to be locked such as an operating lever, so that the member to be locked can be locked at a predetermined position such as a neutral position.

In the conventional various equipments such as a construction equipment and a transporter, an operating lever which is provided to a fixing member such as a housing is used in order to operate hydraulic valves without steps for operating swinging arms of the construction equipment, or the like. Further, an operating lever capable of rotating around two axes crossing with each other is used in order to operate two or more objects to be operated with one operating lever, or in order to operate so as to rotate one object around two axes crossing with each other.

An operational force applied to the above described operating lever is directly transmitted, or transmitted via a means for transmitting the operational force, such as a control cable or a rod, to the object to be operated. The operating lever is set at the neutral position when an operator leaves a seat.

Such conventional devices having an operating lever have no means for locking the operating lever at the neutral position. Therefore, when an operator or the like hits the operating lever with elbow or the like by mistake, the swinging arms dangerously begin to move.

An object of the invention is to provide a locking mechanism having two rotational members assembled so as to cooperate with each other so that the locking state can be released only by moving specific one of the rotational members.

Another object of the present invention is to provide a locking mechanism applied to a device having a member to be locked such as an operating lever so that an operator can easily lock the member to be locked when he leaves a seat.

SUMMARY OF THE INVENTION

According to the present invention, there can be provided a locking mechanism comprising: a frame; a first rotational member being supported on the frame so as to rotate around a first axis and having a guiding portion having a component extending in the radial direction with respect to the first axis; and a second rotational member being supported on the frame so as to rotate around a second axis parallel to the first axis and having an engaging portion to be slidably guided along the guiding portion at the position apart in the radial direction with respect to the second axis, wherein the guiding portion has a stopper capable of being in contact with the engaging portion at the position most apart from the first axis, and when the engaging portion is in contact with the stopper, an angle which a straight line tangential to a guiding way of the guiding portion at the stopper forms with a straight line connecting the engaging portion with the second axis is substantially 90°.

In such a locking mechanism, the second rotational member can rotate around the second axis in the range that the engaging portion is guided along the guiding portion. In that case, the first rotational member is also rotated around the first axis following to the movement of the second rotational member, since the guiding portion of the first rotational member has a component extending in the radial direction with respect to the first axis.

In the state that the engaging poriton of the second rotational member is in contact with the stopper, the straight line tangential to the guiding way of the guiding portion at the stopper forms an angle of substantially 90° with the straight line connecting the engaging portion with the second axis. Therefore, even if trying to rotate the first rotational member in the direction that the guide portion approaches the second axis, the first rotational member is only pressed toward the second axis, i.e. in the direction that the engaging portion is presented toward the stopper. That is to say, the engaging portion is not urged in the direction that the second rotational member can rotate. Further, even if trying to rotate the first rotational member in the direction that the guiding portion leaves the second axis, it is impossible to do so, due to the movable range of these member. Accordingly, it is impossible to rotate the second rotational member in the both directions from the first rotational member side. That is to say, the first rotational member is locked against the frame by the second rotational member. But, the first rotational member can be rotated by applying a force to the second rotational member side so that the engaging portion approaches the first axis and, therefore, the locking state is released.

In case that the guiding portion is provided to the first rotational member so as to extend in the radial direction with respect to the first axis, the second rotational member can be rotated in the both directions until the stopper and the engaging portion are in contact with each other. In that case, once the stopper and the engaging portion are in contact with each other, the first rotational member is locked by the second rotational member.

The locking mechanism of the present invention can be apply to a device having a member to be locked, as described below. That is to say, the rotational members are supported on a frame of the device, and the device is provided with a means for engaging the member to be locked with the first rotational member. When the first member is locked, the member to be locked is also locked with the engaging means. In order to release the locking state, the second rotational member is rotated so that the engaging poriton approaches the first axis.

The above and other objects and advantages of the present invention will become apparent from the following description with the accompanying drawings.

DETAILED DESCRIPTION

Figure 1:
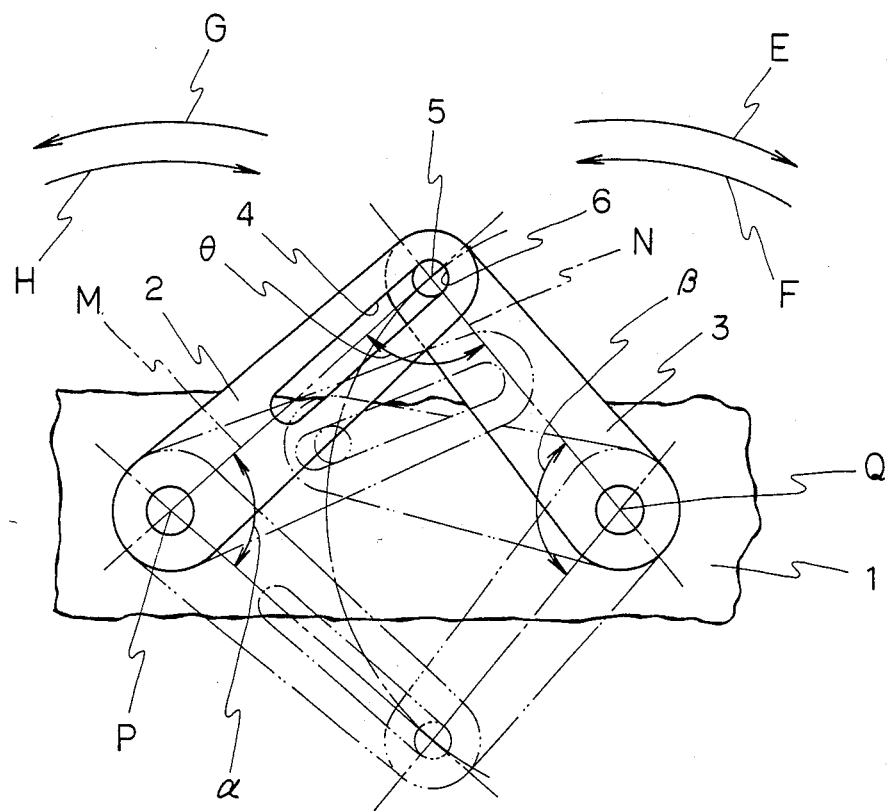
FIG. 1 is a front view showing an embodiment of the locking mechanism of the present invention.

In FIG. 1 showing an embodiment of the locking mechanism of the present invention, numeral 1 indicates a frame. A first plate 2 which is a first rotational member and a second plate 3 which is a second rotational member are supported on the frame 1 so as to rotate around a first axis P and a second axis Q, respectively. The first axis P and the second axis Q are parallel to each other. The first plate 2 has a guiding slit 4 which is a guiding portion. The second plate 3 has a pin 5 which is an engaging portion. The pin 5 is slidably engaged with the guiding slit 4. The guiding slit 4 extends in the radial direction with respect to the first axis P. When the pin 5 is in contact with an inner wall 6 of an outer end of the guiding slit 4, the first plate 2 and the second plate 3 are substantially perpendicular to each other. The inner wall 6 is a stopper.

In the locking mechanism, the first plate 2 rotates in the range of Angle $\alpha$ and the second plate 3 rotates in the range of Angle $\beta$. When rotating the second plate 3 in the range of Angle $\beta$ by applying a force to the second plate 3 side, the first plate 2 rotates in the range of Angle $\alpha$ following to the movement of the second plate 3.

Further, a force in the direction of either Arrow H or Arrow G is applied to the first plate 2 side in the state that the pin 5 is not in contact with the inner wall 6 of the guiding slit 4, the second plate 3 rotates in the direction of either Arrow F or Arrow G.

As shown in FIG. 1, when a force in the direction of Arrow H is applied to the first plate 2 side in the state that the pin 5 is in contact with the inner wall 6, as illustrated with full lines, the second plate 3 cannot rotate in the direction of Arrow F from the reason why the second plate 3 receives only a force in the radial direction with respect to the second axis Q, i.e. does not receive a force in the direction that the second plate 3 can rotate. On the other hand, when a force in the direction of Arrow G is applied to the first plate 2 side in the state that the pin 5 is in contact with the inner wall 6, the first plate 2 does not rotate in the direction of Arrow G, since the range that these plates can move is limited. In such a way, the second plate 3 prevents the first plate 2 from rotating in the direction of either Arrow H or Arrow G.

The reason why the first plate 2 is locked by the second plate 3 is that an angle $\theta$ which a straight line N connecting the pin 5 with the second axis Q forms with a straight line M tangential to a guiding way of the guiding slit 4 at the inner wall 6 is substantially 90° when the pin 5 is in contact with the inner wall 6.

Figure 2:
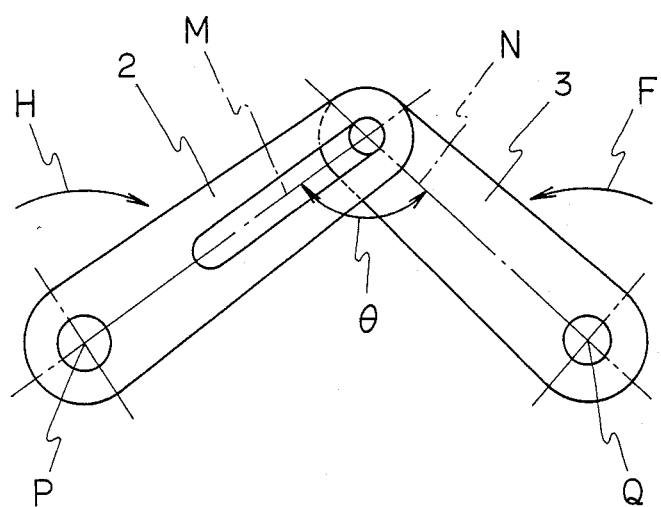
FIGS. 2 to 5 are front views showing locking mechanisms illustrated as comparative examples, respectively.
Figure 3:
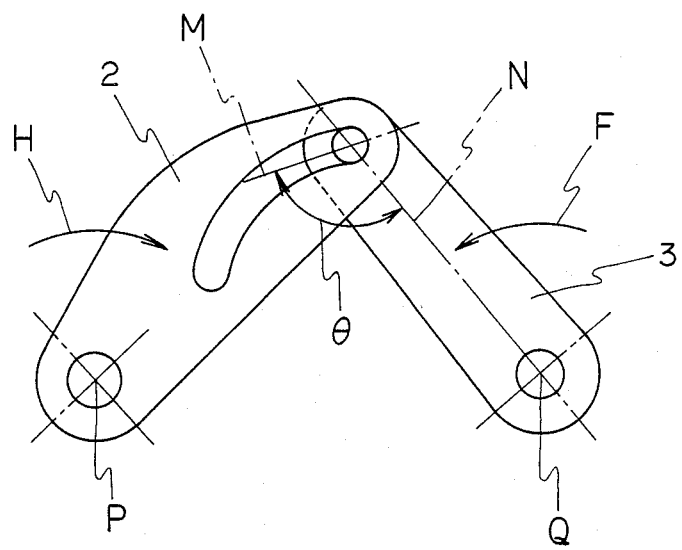
Figure 4:
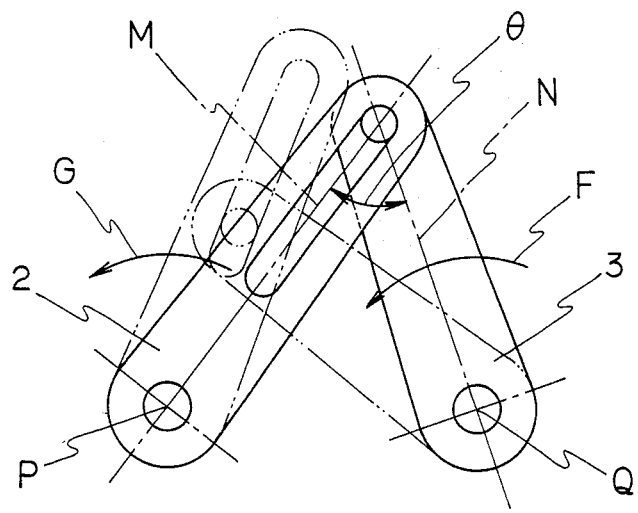
Figure 5:
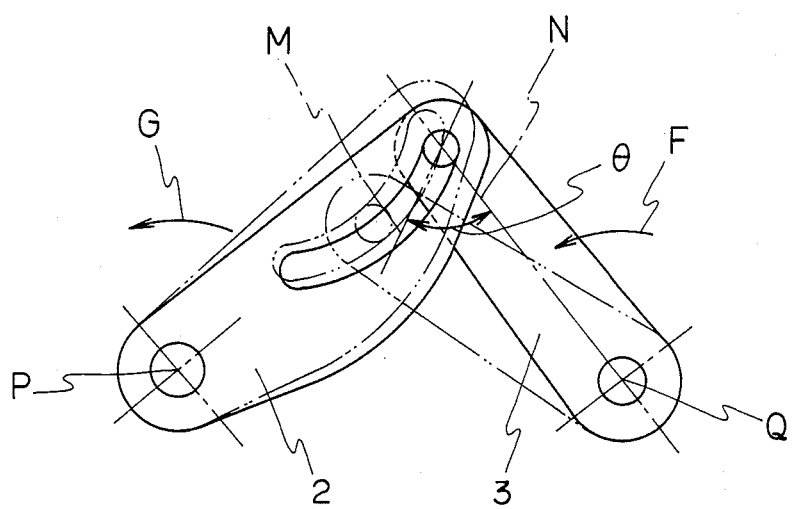

When Angle $\theta$ is larger than 90°, as shown in FIGS. 2 and 3, in the state that the pin 5 is in contact with the inner wall 6, the first plate 2 can rotate in the direction of Arrow H. When Angle $\theta$ is smaller than 90° as shown in FIGS. 4 and 5, the first plate 2 can rotate in the direction of Arrow G.

Figure 6:
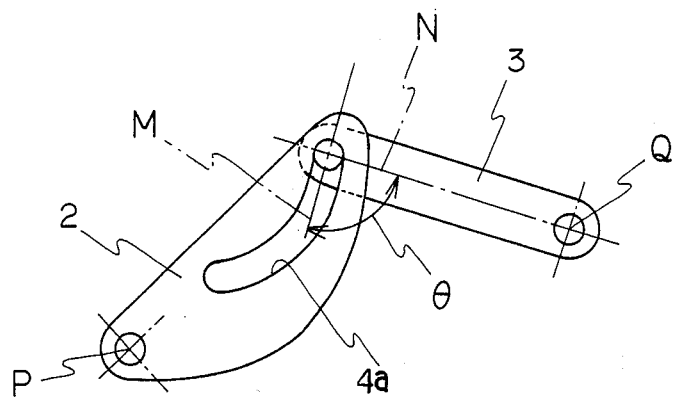
FIGS. 6 to 8 are front views showing other embodiments of the locking mechanism of the present invention, respectively.
Figure 7:
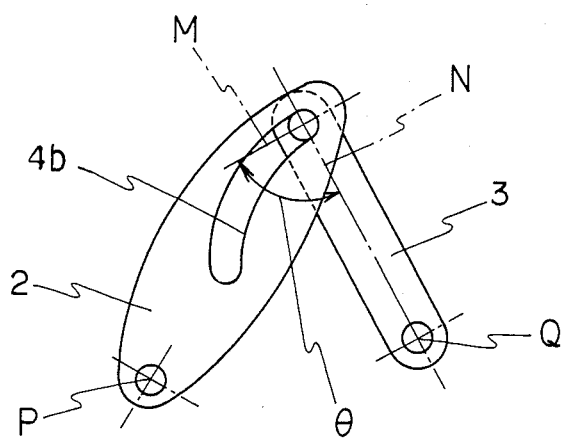

In the present invention, the guiding slit is not limited to a straightly extending slit 4a, 4b, as shown in FIG. 1. For example, a curved slit can be also used as the guiding slit, as shown in FIGS. 6 and 7. In that case, the straight line M must form an angle of substantially 90° with the straight line N, as described above.

The operation of the locking mechanism is described below. When a force in the direction of Arrow F in FIG. 1 is applied to the second plate 3 side, the second plate 3 rotates in the direction of Arrow F, since the pin 5 can slide within the guiding slit 4. Following to the movement of the second plate 3, the first plate 2 also rotates in the direction of Arrow H. At last, the first plate 2 and the second plate 3 become in the state illustrated with imaginary lines. In the state that the pin 5 is again in contact with the inner wall 6 of the guiding slit 4 at the opposite side, it is impossible to rotate the first plate 2 by applyinng a force to the first plate 2 side, since the first plate 2 is locked by the second plate 3.

As described above, in the locking mechanism shown in FIG. 1, when the pin 5 is not contact with the inner wall 6 of the guiding slit 4, the first plate 2 can be rotated by applying a force to the first plate 2 side or the second plate 3 side. However, once the pin 5 is in contact with the inner wall 6, the first plate 2 can be rotated only by applying a force to the second plate 3 side. Therefore, the locking mechanism can be used as "a pair of elements" in various devices such as a device having an operating lever, corresponding to its feature.

The locking mechanism of the present invention is not limited to the mechanisms shown in FIGS. 1, 6 or 7. Various modifications can be applied to the locking mechanism.

Figure 8:
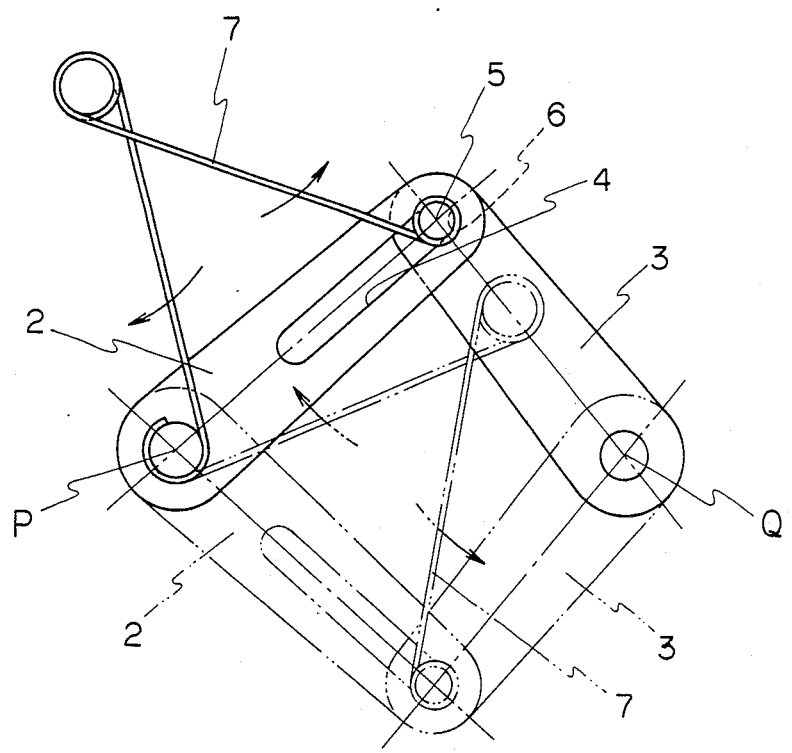

In FIG. 8, the locking mechanism supplementally has a means for always urging the pin 5 toward the inner wall 6 of the guiding slit 4, such as a torsional coil spring 7 shown in the drawing. In such a locking mechanism, the torsional coil spring 7 prevents the locking state from being released due to the weight of the second plate 3, the vibration of the mechanism, or the like.

The shape of the first rotational member and the second rotational member is not limited to the plate-shape Lever-shape, disk-shape, block-shape or rod-shape can also be used as the shape of these members.

Figure 9:
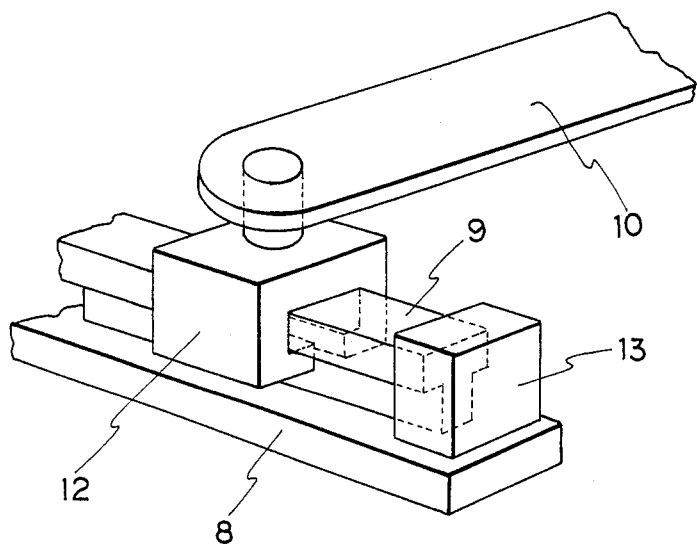
FIGS. 9 and 10 are perspective views showing other examples of the guiding portion used in the present invention, respectively.
Figure 10:
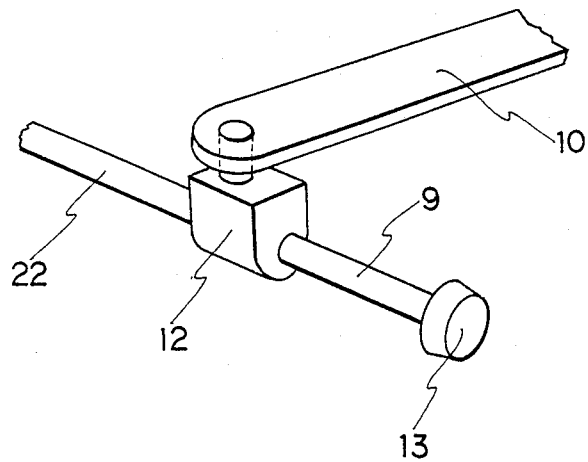

Further, the guiding portion of the present invention is not limited to the guiding slit. As shown in FIGS. 9 and 10, a T-shaped member 9 which is integrally formed on the first rotational member 8 so as to extend in the longitudinal direction thereof, an outer peripheral surface 9 of a rod 22 which is a part of the first rotational member, or the like, can be also used as the guiding portion. In that case, the second rotational member 10 is provided with a sliding block 12 which is an engaging portion capable of being slidably engaged with the T-shaped member, the outer peripheral surface, or the like. The sliding block 12 is rotatably supported on the second rotational member 10. Numeral 13 indicates a stopper for stopping the movement of the guiding block 12 at the terminal end of the guiding portion.

The locking mechanism of the present invention can be applied to a device having a member to be operated, as described below. The locking mechanism of the present invention has an effect that the locking state of one member can be released only by applying a force to the other member, i.e. one member can be locked by the other member at a specific position. Therefore, the locking mechanism of the present invention can be applied to various devices, such as a device having an operating lever, in order to lock the member to be locked.

Figure 13:
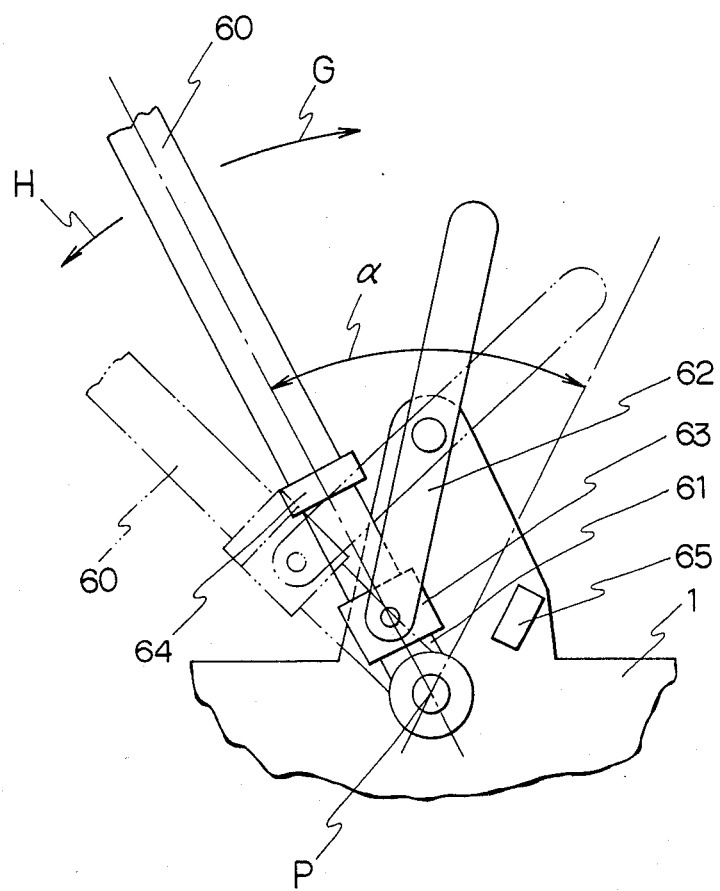
FIG. 13 is a front view showing another embodiment of the device having an operating lever to which the locking mechanism of the present invention is applied.

In that case, parts used in the device having a member to be operated can be used as the frame, the first rotational member and the second rotational member as they are, shown in FIG. 13. On the other hand, these elements can be additionally used in the device, for example, by providing a means for fixing the member to be locked with the first rotational member between the first rotational member and the member to be locked.

Figure 11:
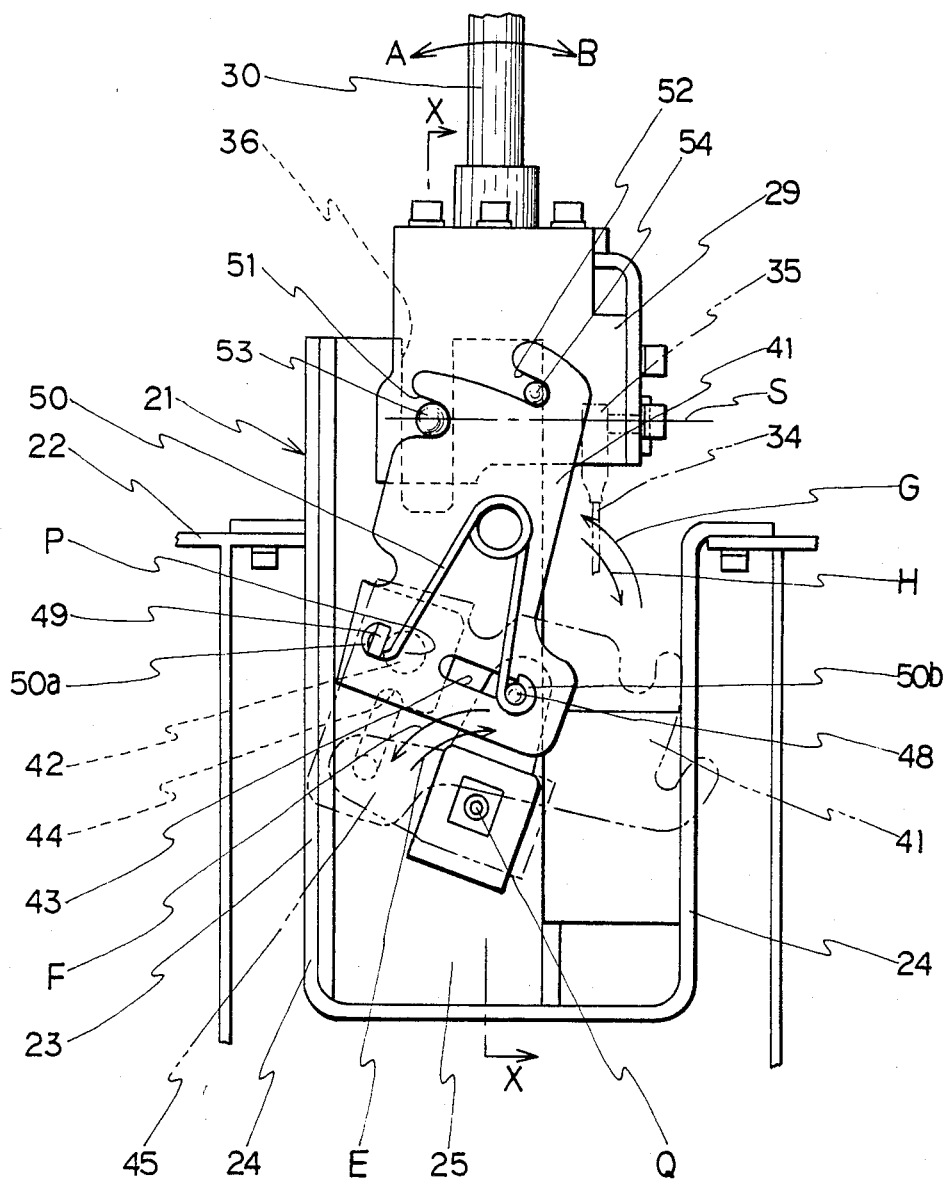
FIG. 11 is a front view showing an embodiment of the device for operating a lever to which the locking mechanism of the present invention is applied.
Figure 12:
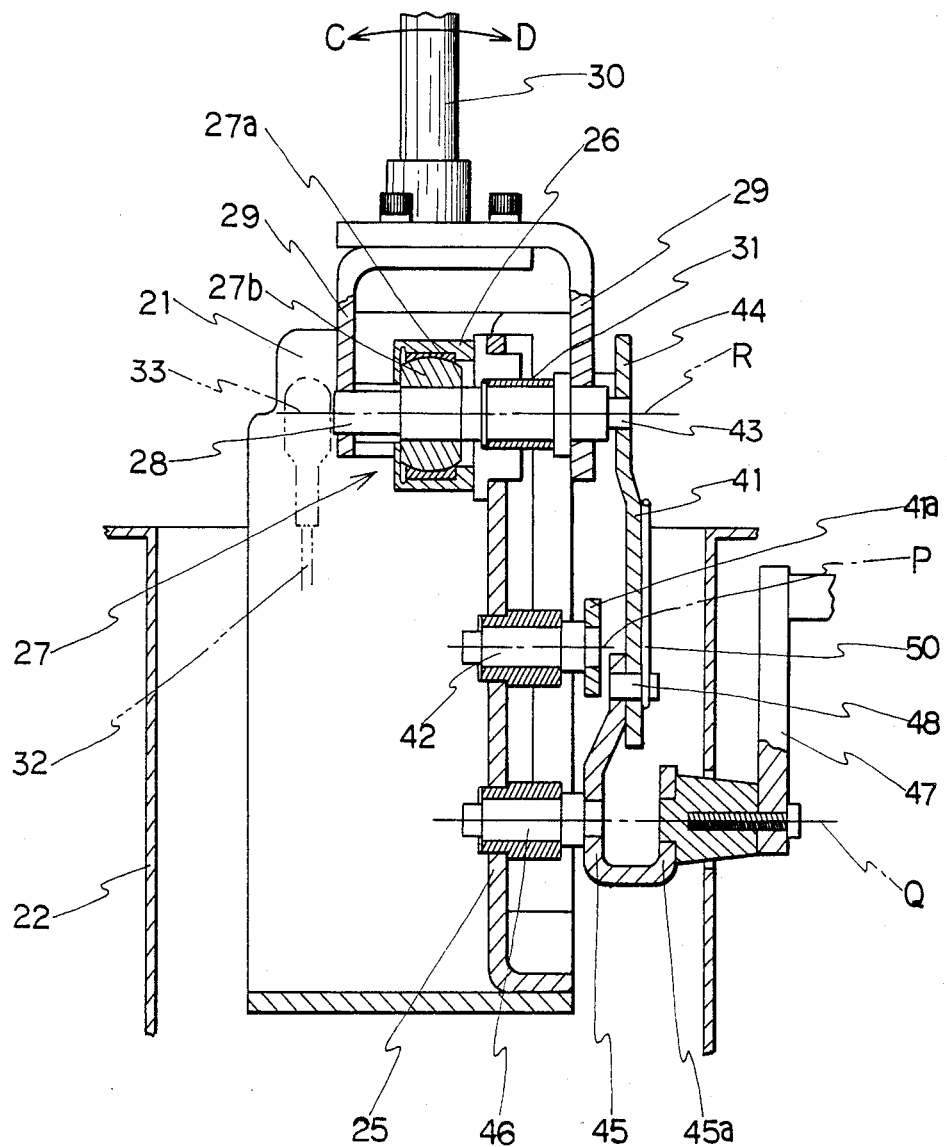
FIG. 12 is a partial sectional view taken along a line X—X of FIG. 11.

An embodiment of the locking mechanism applied to a device having an operating lever is, in detail, described according to the FIGS. 11 and 12. A device for controlling two control cables with an operating lever is shown in FIGS. 11 and 12. The locking mechanism of the present invention can be applied to the device.

A control cable comprises fundamentally a flexible conduit and a flexible inner wire comprising a strand of steel wire, which is slidably inserted into the conduit, and is constructed so as to transmit a push or pull load acted on one end of the inner wire to the other end in order to operate a remote driven device.

Firstly, the device for controlling two control cables is described below. The locking mechanism of the present invention is not limited to the following embodiment, but can be employed in various mechanical operating devices.

In FIGS. 11 and 12, numeral 21 indicates a frame. The frame 21 is fixed to a frame 22 of a construction machine or the like. The frame 21 has a U-shaped plate 23 and a base plate 25 located between both side portions 24 of the U-shaped plate 23.

As shown in FIG. 12, a cylindrical boss 26 is fixed on the upper portion of the base plate 25. The boss 26 contains an outer member 27a of a spherical bearing 27. A main shaft 28 is inserted into an axial hole of an inner member 27b of the spherical bearing 27 and fixed thereto.

Both ends of a U-shaped lever base 29 are fixed to both ends of the main shaft 28, respectively. An end of the operating lever 30 is fixed to the lever base 29.

A guide-axis-portion 31 is provided on an outer periphery of the main shaft 28 in a neighborhood of an end thereof. A first spherical joint 33 for jointing an end of a first control cable 32 is fixed to the other end of the main shaft 28. Further, a second spherical joint 35 jointing an end of a second control cable 34 is fixed to the lever base 29. The second spherical joint 35 is located on a line substantially perpendicular to an axis R of the spherical bearing 27 and to the operating lever 30.

A guiding stopper 36 having a form of slit which is cut so as to extend in the direction perpendicular to the main shaft 28 is formed in the base plate 25 of the frame 21. The guiding stopper 36 guides the guide-axis-portion 31, so as to allow main shaft 28 only to pitch in the vertical direction.

Accordingly, the main shaft 28 has two degrees of freedom of which one is a rotation (in the direction of either Arrow A or Arrow B) around the axis R and of which the other is a rotation (in the direction of either Arrow C or Arrow D) around the axis S perpendicular to a plane including the guide stopper 36. Therefore, the operation of the operating lever 30 has also the two degrees of freedom. The axis R and the axis S are a third axis and a fourth axis, respectively.

In the devices for operating control cables which are constructed as described above, when rotating the operating lever 30 in the direction of either Arrow A or Arrow B, the second spherical joint 35 is moved in the vertical direction, as shown in FIG. 11. As shown in FIG. 12, when rotating the operating lever 30 in the direction of either Arrow C or Arrow D, the first spherical joint 33 is moved in the vertical direction.

The locking mechanism of the present invention can be applied to the device for operating control cables, as described below.

A first plate 41 which is the first rotational member is supported on the base plate 25 of the frame 21 so as to rotate around a first axis 42. In that case, the first axis P of the first axial member 42 is a rotational center line of the first plate 41. The first plate 41 is curved in the form of U-shape so as to avoid interfering with the second axial member 46, as shown in FIGS. 11 and 12. The first plate 41 are supported on the first axial member 42 via the curved portion 41a.

A guiding slit 43 extending in the radial direction with respect to the first axis P is formed as the guiding portion. An inner wall 44 of the outer end of the guiding slit 43 is the stopper.

A second plate 45 which is the second rotational member is supported on the base plate 25 so as to rotate around a second axial member 46. The first axial member 42 and the second axial member 46 are parallel to each other. A second axis Q of the second axial member 46 is a rotational center line of the second plate 41.

The second plate 45 is curved in the form of U-shape, as shown in FIGS. 11 and 12, so as to avoid interfering with the first axial member 42 on the rotational movement. A crank-type locking lever 47 is provided on the curved portion 45a so as to ride on the second axis Q.

The second plate 45 is provided with a pin being the engaging portion which is engaged with and slidably guided within a guiding slit 43.

The guiding slit 43 of the first rotational plate 41 and the pin 48 of the second plate 46 are arranged in a way that an angle which a straight line tangential to the guiding way of the guiding slit 43 forms with a straight line connecting the pin 48 with the second axis Q is substantially 90° in the state that the pin 48 is in contact with the inner wall of the outer end of the guiding slit 43.

Further, in the locking mechanism shown in FIGS. 11 and 12, a projection 49 is provided near the first axial member 42 of the first plate 41. Both ends 50a, 50b of a torsional coil spring 50 are engaged with the projection 49 and the pin 48, respectively. Therefore, the second plate 45 is elastically urged to the inner wall 44.

An engaging slit 51, in the form of a circular arc, of which center is the first axis P, is provided to an upper end of the first plate 41. The engaging slit 51 is engaged with a first pin 53 which is an end of the main shaft 28 by rotating the first plate 41 in the direction of Arrow G. At the same time, an engaging slit 52 similar to the engaging slit 51 is engaged with a second pin 54 which is provided on the lever base 29, as shown in FIG. 11.

The operation of the locking mechanism described above is described below.

When rotating the locking lever 47 shown in FIG. 12 in the direction of Arrow E shown in FIG. 11 after positioning the operating lever 30 to a neutral position, the second plate 45 is also rotated in the direction of Arrow E. Since the pin 48 and the guiding slit 43 are engaged with each other, the first plate 41 rotates in the direction of Arrow G and the slits 51, 52 are engaged with the pins 53, 54 and, therefore, the operating lever 30 is locked in the state illustrated in FIG. 11 with full lines.

In that case, the operating lever 30 is prevented from rotating around the main shaft (the axis R) 28, i.e. in the direction of either Arrow A or Arrow B, since the engaging slit 52 and the second pin 54 are engaged with each other. On the other hand, the operating lever 30 is prevented from rotating around the axis S perpendicular to the main shaft 28, i.e. in the direction of either Arrow C or Arrow D, since the engaging slit 51 and the first pin 53 are engaged with each other.

Accordingly, the operating lever 30 having two degrees of freedom is surely locked. That is to say, even if the operating lever 30 receives an external force, the operating lever 30 cannot move since the first plate 41 is locked.

Further, in case of locking an operating lever capable of rotating around two axes, the operating lever can be locked by providing only one pin at the position offsetted from the two axes. However, in case of locking the operating lever with two pins as described above, the locking operation is more surely performed, preferably.

As described above, the operating lever 30 can be surely locked by an simple operation. For example, at the time when the operator of the construction equipment, the transportor, or the like, leaves the seat, the operating lever 10 tends to receive an external force by mistake. However, there is no fear that the lever is operated by mistake, since the operational lever 10 is surely locked.

In case of releasing the locking state, the locking lever 47 is rotated in the direction of Arrow F so that the second plate 45 can be rotated in the direction of Arrow F. Therefore, the first plate 41 comes into the state illustrated with imaginary lines, so that the engagements between the slits 51, 52 and the pins 53, 54 are released. In that state, the operating lever 30 can be freely operated. Further, in the state illustrated in FIG. 11 with imaginary lines, the trouble that the operating lever 30 is locked by moving the first plate 41 to the state illustrated with full times by mistake due to a vibration, or the like, can be avoided, since the first plate is also locked in the state illustrated with imaginary lines. In the locking mechanism applied to the device for operating control cables, the torsional coil spring 50 can be used as a means for always urging the pin 48 toward the inner wall 49 of the outer end of the guiding slit 43 in order to more surely perform the locking operation. As the urging member, various springs such as a compression coil spring, a tension coil spring and a plate spring or an elastic member except the springs can be also used instead of the torsional coil spring.

As a means for engaging between the operating lever 30 which is a member to be locked and the first plate 41 which is a first rotational member, a surface of the member to be locked and a surface of the first rotational member may be made to be engaged with each other. Further, a projection (or a concave) formed on the surface of the member to be locked may be engaged with a concave (or a projection) formed on the surface of the first rotational member.

In FIG. 13, another embodiment of the device to which the locking mechanism of the present invention is applied is shown. As shown in FIG. 13, an operating lever 60 which is the first rotational member is supported on the frame 1 so as to rotate around the first axis P. A basal part 61 of the operating lever 60 is the guiding portion. A locking member 62 which is the second rotatonal member is supported on the frame 1 so as to rotate around a second axis Q extending parallel to the first axis P. The locking member 62 has an engaging block 63 which is the engaging portion, at its end. The engaging block 63 can slide on the basal part 61 of the operating lever 60 and can rotate at the end of the locking member 62. The operating lever 60 has a stopper 64 in the form of collar at an upper portion of the basal part 61.

In the embodiment shown in FIG. 13, the operating lever is per se the first rotational member. That is to say, the operating member 60 can be rotationally operated. However, when the operating lever 60 is rotationally operated in the direction of Arrow H to the limited position shown with imaginary lines, the operating lever 60 is locked at its position and, therefore, the lever 60 cannot be operated. When the locking member 62 is rotated in the direction of Arrow H from the locking state, it is possible to again operate the lever 60. As shown in FIG. 13, numeral 65 is a stopping member for limiting the rotational range of the operating lever 60 in the direction of Arrow G.

The locking mechanism of the present invention can be employed to various mechanical elements, since very simple parts are used. Further, though the locking mechanism has a simple structure, the mechanical elements can be surely locked. Further, when supplementally using the urging means, the locking operations can be more surely performed.

What is claimed is:

1. A locking mechanism comprising:
    (a) a frame;
    (b) a first rotational member being supported on the frame so as to rotate around a first pin and having a guiding portion having a component extending in the radial direction with respect to said first pin and a stopper at the end of said guiding portion;
    (c) a second rotational member being supported on the frame so as to rotate a second pin parallel to said first pin and having an engaging portion to be slidably guided along the guiding portion of said first rotational member in the radial direction with respect to said second pin; and
    (d) a torsion spring connected at one of its ends to one of said first and second pins and at its other end to said engaging portion for continuoulsy urging said engaging member toward said stopper,
    wherein the guiding portion has a stopper capable of being in contact with the engaging portion at the position most apart from said first pin, and when the engaging portion is in contact with the stopper, an angle which is straight line tangential to the guiding portion at the stopper forms with a straight line connecting the engaging portion with said second pin is substantially 90°.

2. The locking mechanism of claim 1, wherein said guiding portion is a guiding slit, said engaging portion is a pin, and said stopper is an inner wall of an outer end of said guiding slit.

3. A locking mechanism comprising:
    (a) a frame;
    (b) a member to be locked movably supported on said frame;
    (c) a first rotational member supported on said frame for rotation around a first pin and having a guiding portion having a component extending in the radial direction with respect to said first pin and a stopper at the end of said guiding portion and having an engaging means for locking said member to be locked;
    (d) a second rotational member supported on said frame for rotation around a second pin parallel to said first pin and having an engaging portion to be slidably guided along said guiding portion of said first rotational member in the radial direction with respect to said second pin; and (e) a torsion spring connected at one of its ends to one of said first and second pins and at its other end to said engaging portion for continuously urging said engaging member toward said stopper, wherein said guiding portion has a stopper capable of being in contact with said engaging portion at the position most apart from said first pin, and when the engaging portion is in contact with said stopper, an angle which a straight line tangential to said guiding portion at said stopper forms with a straight line connecting the engaging portion with said second pin is substantially 90°.

4. The locking mechanism of claim 3, wherein said guiding portion is a guiding slit, and said engaging portion is a pin, and said stopper is an inner wall of an outer end of said guiding slit.

5. The locking mechanism of claim 3, wherein said member to be locked is an operating lever rotatably supported to said frame, and said engaging means is at least one engaging pin provided at the position radially apart from the rotational center line of said operating lever, and said first rotational member has at least one engaging slit capable of engaging with said engaging pin at the position radially apart from said first pin.

6. The locking mechanism of claim 3, wherein a locking lever for rotationally operating said second rotational member around said second pin is provided to said second rotational member.

7. A locking mechanism comprising:

(a) a frame;

(b) a member to be locked movably supported on said frame;

(c) a first rotational member supported on said frame for rotation around a first pin and having a guiding portion having a component extending in the radial direction with respect to said first pin and a stopper at the end of said guiding portion and having an engaging means for locking said member to be locked;

(d) a second rotational member supported on said frame for rotation around a second pin parallel to said first pin and having a engaging portion to be slidably guided along said guiding portion of said first rotational member in the radial direction with respect to said second pin; and (e) a torsion spring connected at one of its ends to one of said first and second pins and at its other end to said engaging portion for continuously urging said engaging member toward said stopper;

wherein said guiding portion has a stopper capable of being in contact with said engaging portion at the position most apart from said first, and when the engaging portion is in contact with said stopper, an angle which is a straight line tangential to said guiding portion at said stopper forms with a straight line connecting the engaging portion with said second pin is substantially 90°;

wherein said member to be locked is an operating lever rotatably supported to said frame, and said engaging means is at least one engaging pin provided at the position radially apart from the rotational center line of said operating lever, and said first rotational member has at least one engaging slit capable of engaging with said engaging pin at the position radially apart from said first pin; and wherein said operating lever can be rotated around a first axis and around a second axis crossing with said first axis, and said engaging pin has a first engaging pin and a second engaging pin parallel to and apart from said first engaging pin, and said first rotational member is provided with two engaging slits capable of engaging with said first and second engaging pins.

* * * * *